(12) United States Patent
Carter

(10) Patent No.: US 10,475,259 B2
(45) Date of Patent: Nov. 12, 2019

(54) SECURITY SYSTEM AND METHOD OF USING SAME

(71) Applicant: Ronald Carter, Matthews, NC (US)

(72) Inventor: Ronald Carter, Matthews, NC (US)

(*) Notice: Subject to any disclaimer, the term of this patent is extended or adjusted under 35 U.S.C. 154(b) by 0 days.

(21) Appl. No.: 15/938,846

(22) Filed: Mar. 28, 2018

(65) Prior Publication Data
US 2018/0286154 A1 Oct. 4, 2018

Related U.S. Application Data

(60) Provisional application No. 62/481,096, filed on Apr. 3, 2017.

(51) Int. Cl.
G07C 9/00 (2006.01)
H04L 9/08 (2006.01)
G07F 17/12 (2006.01)
G09C 5/00 (2006.01)
G06Q 10/08 (2012.01)

(52) U.S. Cl.
CPC ..... *G07C 9/00015* (2013.01); *G07C 9/00571* (2013.01); *G07C 9/00896* (2013.01); *G07F 17/12* (2013.01); *G09C 5/00* (2013.01); *H04L 9/0819* (2013.01); *H04L 9/0861* (2013.01); *G06Q 10/083* (2013.01); *G07C 2009/00246* (2013.01); *G07C 2209/08* (2013.01)

(58) Field of Classification Search
CPC ............ G07C 9/00896; G07C 9/00912; G07C 9/00571; G07C 9/00309; G07C 9/00103; G07C 2209/08; G07C 2009/00936; G07C 2009/00793; G07C 9/00182

USPC ......................................... 340/5.73
See application file for complete search history.

(56) References Cited

U.S. PATENT DOCUMENTS

| 6,300,873 | B1 | 10/2001 | Kucharczyk et al. |
| 7,193,644 | B2 | 3/2007 | Carter |
| 8,139,098 | B2 | 3/2012 | Carter |
| 8,144,183 | B2 | 3/2012 | Carter |
| 8,154,581 | B2 | 4/2012 | Carter |
| 8,164,614 | B2 | 4/2012 | Carter |
| 8,667,297 | B2 * | 3/2014 | Salter ............... H04M 1/675 713/186 |
| 8,758,135 | B2 | 6/2014 | Carter et al. |
| 8,831,970 | B2 | 9/2014 | Weik, III et al. |

(Continued)

FOREIGN PATENT DOCUMENTS

CN 103584701 A 2/2014

OTHER PUBLICATIONS

Google. English translation of foreign patent document CN103584701A. Feb. 19, 2014.

(Continued)

Primary Examiner — Mark S Blouin
(74) Attorney, Agent, or Firm — Ashley Law Firm P.C.; Stephen S. Ashley, Jr.

(57) ABSTRACT

A security system can include a doorbell device comprising a scanner, and a locking mechanism operatively connected to the scanner and a structure, such as a home or lockbox. A key, which can be in the form of a bar code, can be generated and sent to delivery or service personnel needing access to the structure. The delivery or service personnel present the bar code to the scanner. Upon reading the bar code, the locking mechanism is unlocked thereby allowing access to the structure.

20 Claims, 2 Drawing Sheets

(56) References Cited

U.S. PATENT DOCUMENTS

| | | | |
|---|---|---|---|
| 9,195,819 B2 | 11/2015 | Hudson et al. | |
| 9,499,128 B2* | 11/2016 | Reh | B60R 25/24 |
| 9,508,207 B2* | 11/2016 | Kalb | G07C 9/00571 |
| 9,608,970 B1* | 3/2017 | Gehret | H04L 63/062 |
| 9,640,040 B2* | 5/2017 | Irudayam | G07F 19/202 |
| 9,652,912 B2 | 5/2017 | Fadell et al. | |
| 9,805,534 B2 | 10/2017 | Ho et al. | |
| 9,821,768 B2 | 11/2017 | Oz et al. | |
| 9,842,447 B2* | 12/2017 | Badger, II | B60R 25/102 |
| 9,870,698 B2* | 1/2018 | Rabb | G08B 25/008 |
| 9,911,290 B1* | 3/2018 | Zalewski | G07G 1/0072 |
| 9,923,879 B1* | 3/2018 | Ziraknejad | H04L 63/06 |
| 9,978,238 B2* | 5/2018 | Fadell | G08B 19/005 |
| 10,043,332 B2* | 8/2018 | Scalisi | G06Q 10/0833 |
| 10,147,249 B1* | 12/2018 | Brady | G07C 9/00103 |
| 10,304,273 B2 | 5/2019 | Johnson et al. | |
| 2002/0156645 A1 | 10/2002 | Hansen | |
| 2006/0271437 A1 | 11/2006 | Maggio | |
| 2009/0278390 A1 | 11/2009 | Carter | |
| 2009/0278683 A1 | 11/2009 | Carter | |
| 2009/0278912 A1 | 11/2009 | Carter | |
| 2009/0284578 A1 | 11/2009 | Carter | |
| 2009/0284595 A1 | 11/2009 | Carter | |
| 2011/0025817 A1 | 2/2011 | Carter | |
| 2011/0032360 A1 | 2/2011 | Carter | |
| 2012/0262581 A1 | 10/2012 | Carter | |
| 2013/0100230 A1 | 4/2013 | Carter | |
| 2013/0122777 A1 | 5/2013 | Carter | |
| 2013/0169737 A1 | 7/2013 | Carter | |
| 2014/0339306 A1 | 11/2014 | Lin et al. | |
| 2015/0120015 A1 | 4/2015 | Fadell et al. | |
| 2015/0120529 A1 | 4/2015 | Faaborg | |
| 2015/0120596 A1 | 4/2015 | Fadell et al. | |
| 2015/0186840 A1 | 7/2015 | Torres et al. | |
| 2015/0310381 A1 | 10/2015 | Lyman et al. | |
| 2016/0066733 A1 | 3/2016 | Gozar | |
| 2016/0171435 A1 | 6/2016 | Newton et al. | |
| 2016/0300187 A1 | 10/2016 | Kashi | |
| 2016/0374494 A1 | 12/2016 | Geng | |
| 2017/0091710 A1 | 3/2017 | Van Dyke | |
| 2017/0124510 A1 | 5/2017 | Caterino et al. | |
| 2017/0355076 A1 | 12/2017 | Gordon-Carroll et al. | |
| 2017/0372261 A1 | 12/2017 | Bhatia et al. | |
| 2018/0357848 A1 | 12/2018 | McLellan et al. | |

OTHER PUBLICATIONS

Le Vinh et al., Middleware to integrate mobile devices, sensors and cloud computing, Jan. 1, 2015.

Viderberg, Security evaluation of smart door locks, Jun. 17, 2019.

Ho et al., Smart locks: Lessons for securing commodity internet of things devices, May 30, 2016.

Schneider et al., Using GeoFencing as a means to support flexible real time applications for delivery services, Jun. 12, 2008.

* cited by examiner

US 10,475,259 B2

SECURITY SYSTEM AND METHOD OF USING SAME

CROSS REFERENCE TO RELATED APPLICATIONS

This application claims priority to Provisional Patent Application No. 62/481,096, filed Apr. 3, 2017, which is incorporated by reference herein.

TECHNICAL FIELD OF INVENTION

The present invention relates to a security system. An embodiment of the invention comprises a method of shipping and delivering goods. Another embodiment of the invention comprises a system for providing access to a secured structure, such as a residence. Another embodiment of the invention comprises the establishment of a network of artificial intelligence devices utilized to enhance security in the e-commerce sector.

BACKGROUND OF INVENTION

Many consumers today purchase goods on the Internet from online retailers, and this form of shopping is expected to increase in the years to come. This form of shopping, which has become commonplace, requires the purchased goods to be shipped to the purchaser. Often, the goods are packaged and delivered to the residence of the purchaser while the purchaser is not home, and the packaged goods are merely left unsecured by the door of the purchaser's residence. Of course, such packages are prone to being stolen, resulting in significant financial loss to the online retailer.

SUMMARY

Therefore, one object of the present invention is to provide a system that provides a secure and reliable means for delivering packages to a location. Another object of the invention is to provide a system that provides a system that tracks and confirms when a package has been securely delivered to the intended location. These and other objects of the invention can be achieved in the various embodiments of the invention disclosed herein.

An embodiment of the invention comprises a system for shipping and delivering goods.

Another embodiment of the invention comprises a system for allowing authorized persons to access a secured structure, such as a residence.

Another embodiment of the invention comprises a doorbell apparatus comprising a scanner and a mobile app. The mobile app can be utilized by merchants and allows the transfer of specific barcode(s) and other information. The app can create virtual keys, which may be sent to delivery or service personnel.

Another embodiment comprises a security system comprising a scanner device operatively connected to a computer processor and a non-transitory computer readable storage medium comprising software having programming instructions that, when executed, cause the computer processor to generate a virtual key and transmit the virtual key to a recipient, wherein the scanner device is adapted to read the virtual key from the recipient.

According to another embodiment of the invention, the virtual key can be a bar code, a graphic image, and/or an alphanumeric character.

According to another embodiment of the invention, the security system can include a locking mechanism adapted to change between a locked position and an unlocked positioned. The locking mechanism is operatively connected to a structure and the scanner device, wherein the scanner device transmits a signal to the locking mechanism causing the locking mechanism to reside in the unlocked position when the scanner device reads the virtual key from the recipient.

According to another embodiment of the invention, the structure can be the door of a building or residence, the door of a storage locker or lockbox, or a container lid.

According to another embodiment of the invention, the recipient can be a delivery service.

According to another embodiment of the invention, the virtual key expires after a predetermined period of time.

According to another embodiment of the invention, at least one artificial intelligence device can be operatively connected to the scanner device and the computer processor.

According to another embodiment of the invention, a network of connected artificial intelligence devices are operatively connected to the scanner device and the computer processor.

According to another embodiment of the invention, membership in the network is accepted via a unique identifier.

Another embodiment of the invention comprises a secured delivery system comprising a doorbell device comprising a scanner, and a lock operatively connected to the scanner and a structure. The lock is adapted for changing between a locked position, in which an interior of the structure cannot be accessed and an unlocked position, in which the interior of the structure can be accessed. The system includes a computer processor and a non-transitory computer readable storage medium comprising software having programming instructions that, when executed, cause the computer processor to generate a virtual key and transmit the virtual key to a delivery service, wherein the scanner is adapted to read the virtual key from the recipient and upon reading the virtual key transmits a signal to the lock causing the lock to move to the unlocked position whereby the interior of the structure can be accessed.

According to another embodiment of the invention, the virtual key can be a bar code, a graphic image, and/or an alphanumeric character.

According to another embodiment of the invention, the virtual key expires after a predetermined amount of time or a predetermined number of uses.

According to another embodiment of the invention, the doorbell device further comprises a housing, an audio speaker, a camera, a microphone, and/or a light.

According to another embodiment of the invention, at least one artificial intelligence device is operatively connected to the scanner device and the computer processor.

According to another embodiment of the invention, a network of connected artificial intelligence devices is operatively connected to the scanner device and the computer processor.

According to another embodiment of the invention, membership in the network is accepted via a unique identifier.

Another embodiment of the invention comprises a method of delivery comprising a method of delivering an item purchased online comprising providing a scanner device, positioning the scanner device proximate a structure, and operatively connecting a lock to the scanner device and the structure. The lock is adapted for changing between a locked position, in which an interior of the structure cannot be accessed and an unlocked position, in which the interior of the structure can be accessed. Upon purchase of the item, a virtual key is created and transmitted to a delivery service responsible for delivering the item to the purchaser of the item. The virtual key is presented to the scanner device. The scanner device reads the virtual key, and the lock is moved to the unlocked position whereby the interior of the structure can be accessed.

According to another embodiment of the invention, the virtual key is transmitted to the purchaser of the item.

DETAILED DESCRIPTION OF PREFERRED EMBODIMENTS

Figure 1:
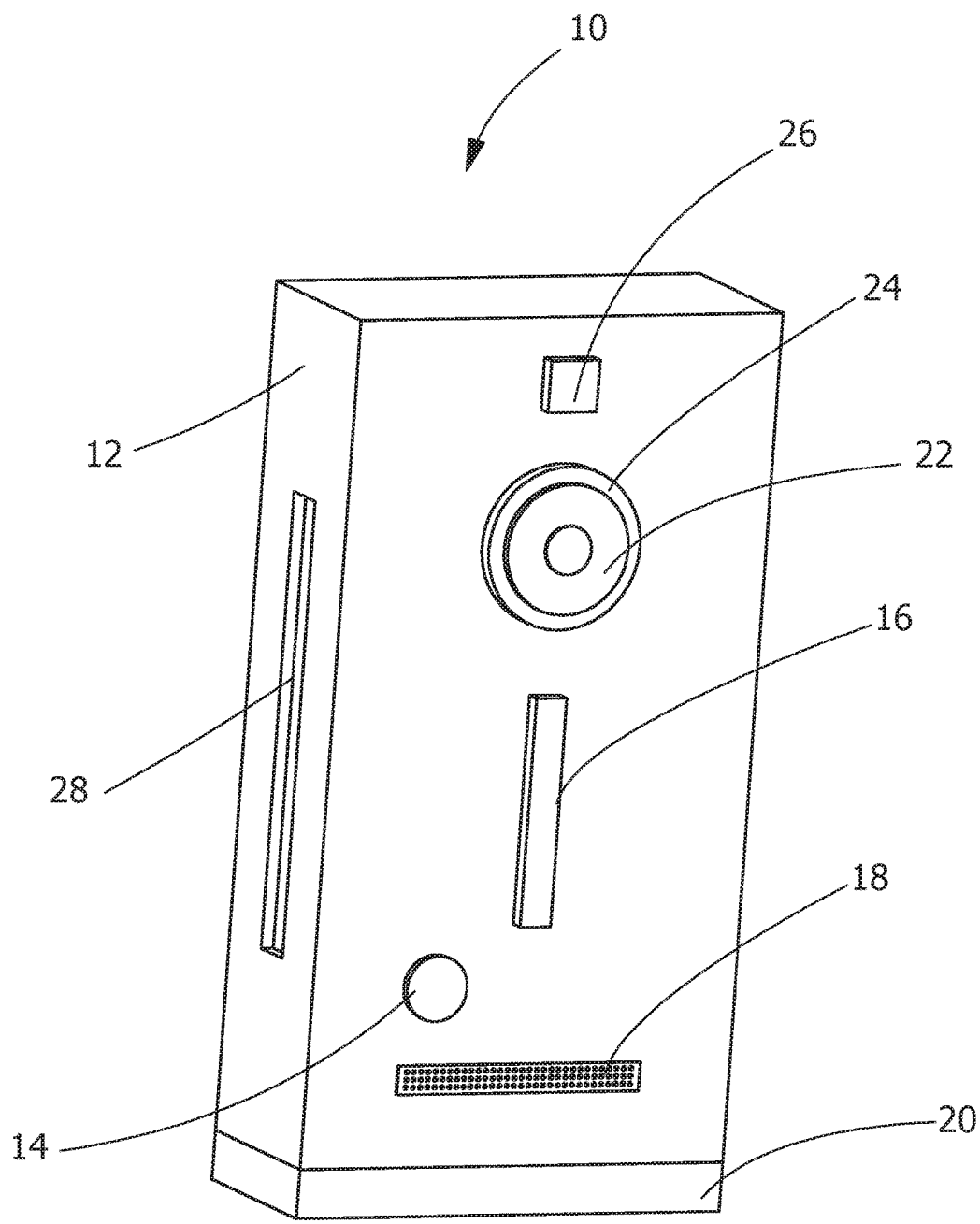
FIG. 1 is a perspective view of doorbell device according to a preferred embodiment of the invention.

A security system according to a preferred embodiment of the invention comprises a doorbell device shown generally at reference numeral 10 in FIG. 1. The doorbell device 10 comprises a housing 12, a motion sensor 14, at least one button 16 for activating the device 10, an audio speaker 18, a scanner 20, a camera 22, a microphone 24, and a light 26. The scanner 20 is capable of scanning bar codes, images, pictures, and numbers.

The doorbell device 10 can be positioned on or proximate to a door, and the system can include a lock on the door. The doorbell device 10 can include a computing device comprising a computer processor, such as a microcontroller. The microcontroller is operatively connected to the scanner and the lock on the door via a wifi or Bluetooth signal. When the scanner 20 scans and processes a preprogrammed bar code, image, number or pictures, the microcontroller of the doorbell device 10 sends a signal unlocking the door lock. The doorbell device 10 can include a card reader 28 adapted for electronically reading identification cards, credit cards, and the like. The microcontroller can comprise a computer processor and a non-transitory computer readable storage medium comprising software having programming instructions that, when executed, cause the microcontroller to carry out the above described steps. According to an embodiment of the invention, the software can be adapted for use as an application on a mobile smart phone. The doorbell device 10 can include and interface with one or more artificial intelligence devices.

According to another embodiment of the invention, the system comprises the doorbell device 10 or an independent scanner located near or secured to a door, or in proximity to or secured to a lock box or other storage apparatus. The lock box or other storage apparatus can be adapted to contain letters, packages, or other deliveries. The lock box can be located near an entry point, built into a residential or commercial structure, located in a free-standing structure such as a mailbox or decorative column, in the ground or other places within the range of a wifi/Bluetooth signal.

The independent scanner can have wireless or wired capabilities. The entire system can be wired, wireless or battery operated. A warning signal is delivered to an administrator(s) when any battery in the system becomes weak.

The independent scanner is capable of reading bar codes, images, numbers, pictures. Upon reading and processing a preprogrammed bar code, image(s), numbers or pictures, a lock on the door, lock box or other storage apparatus is unlocked. Also, upon reading and processing of preprogrammed bar code, image(s), numbers or pictures, an appointed message or a general message can be delivered via a text to a mobile phone or an e-mail.

The independent scanner is capable of voice recognition. The independent scanner can comprise numbered buttons for additional authentication or to route information or notification to the appropriate user/client/owner. The independent scanner can be located at an entry point or in proximity of a lock box, storage facility or compartment. The scanner can comprise a storage or lockbox container with a built-in scanner either wired, wireless or battery operated.

According to an embodiment of the invention, the system can include a card reader capable of reading identification cards, credit cards, and the like. The card reader can be incorporated in the doorbell device 10, or in the independent scanner.

According to an embodiment of the invention, the system can include a scanner/reader incorporated in another device connected to a storage container, box, storage facility or the like.

According to an embodiment of the invention, the system can include a secure storage container located on a property for the purpose of receiving packages and deliveries. The container can have an automatic locking and unlocking mechanism triggered by the scanner remotely via wireless technology. The storage container can be built into a structure, such as a house, located inside a column or other decorative structure, or can be free standing. The storage container or lock box can be equipped with a scanner.

According to an embodiment of the invention, the system can include a computer processor and a non-transitory computer readable storage medium comprising software having programming instructions that, when executed, cause a computer processor to carry out various steps described herein. According to an embodiment of the invention, the software can be adapted for use as an application on a mobile smart phone.

The software enables a user to create a virtual key. The virtual key can be a bar code, text, number, picture, image and/or other data that is input by the user for the purpose of identifying a predetermined match, which when so identified causes an associated lock to be unlocked and/or otherwise allows access to a secured location or container. A numeric code can be used for additional authentication or identification of an intended individual, location, compartment, or container.

Notifications from the scanner can be sent wirelessly to the appropriate respondent enabling a remote signature receipt. The software application is capable of voice recognition. The software can create bar codes, images, and pictures and can forward them, such as by text or e-mail, to allow access to authorized visitors, deliveries, service personnel, and the like.

The software application can deliver a specific message for the specific bar code, image, picture and/or number(s) to input. The software enables remote programming of the scanner, lockbox, storage etc.

The software application enables remote two-way communication via wireless mobile devices. The software application coordinates the actions of all features of the system. The software application can receive data from a plurality of mobile devise or fixed devices via Internet, wifi, or other wireless or wired means.

The software enables the programmer to create a virtual key, which can be a unique barcode, character, picture, letter(s) and/or number(s). A corresponding virtual key is sent to designated recipient(s), such as delivery or service personnel. When scanned, access is gained, or a message is delivered from the system. The software allows access and messages to expire as programmed in accordance with each unique barcode, character, picture, letter(s) and/or number(s).

Each virtual key can be programmed to have a predetermined limited life span. Upon creating a virtual key, the user can select a predetermined date and time at which the virtual key will expire and no longer provide access.

The software can require a driver's license scan or card reader for the purposes of verifying entry. The software can time stamp every activation and document identity when desired. The software allows notifications to be sent to one or more mobile devices.

The software enables the person notified wirelessly to forward a unique barcode, character, picture, letter(s) and/or number(s) etc. to one or more recipients to provide access or messages.

The software can send a delivery confirmation to the sender, the delivery service and/or others involved. The software allows owners to change access according to need for residents or guests, thereby eliminating the need to change locks.

The software enables preprogrammed messages, directives to different individuals in accordance with the corresponding scan. The software enables a remote signature, symbol, and/or image to be sent from a handheld device to the system, enabling the delivery person to obtain such through the scanner or doorbell or other system apparatus.

The software can allow a mobile or stationary transmission of a barcode, image, etc. for the purposes of access, message and/or information. The software has voice recognition and artificial intelligence, enabling dissemination to appropriate users and interface with an authorized delivery person or guest. The artificial intelligence can provide information, directives, and/or greetings etc.

The software application enables all devices in the system to be synchronized in a secure manner by user names and passwords or similar identification protocol. The system comprises:

Scanner/Scanner/Doorbell/Light apparatus mounted in proximity to a door, lockbox, storage, compartment or other secured location or container.

Scanner can include illumination, camera, speaker, microphone, alarm, and reader(s) for cards, mobile phones, and mobile devices.

Controller comprised of keys for creation of a variety of selected inputs to be sent or transmitted to the scanner or to an individual(s) with a remote device or to an email address, or other address. Each input has the capability of triggering a corresponding message, directive, etc. from the system when a scan is performed.

Controller(s) consisting of programmable devices (computer, laptop, cell phone, tablet etc.) running a software application controlling one or more systems of the invention (VSAT).

Lock box(s), storage, compartments for storage of deliveries that interface with the controller and the scanner.

Software with a menu of features to customize the VSAT system for uses such as managing construction sites and deliveries, providing remote contact by real estate agents with prospective buyers, forwarding an electronic code for access utilizing the scanners, and serving property owners with a secure method of receiving deliveries.

A camera for monitoring package deliveries.

Two-way communication for wireless communication between person initiating scan and appropriate person(s).

Motion detection for activation of system or the pressing of a button.

If a delivery package requires a signature and the occupant is not home, the scan will enable the system to notify the occupant and an electronic signature can be forwarded to the deliverer as well as remote access triggered to the selected lockbox, storage, compartment, etc.

An app enabling networking of artificial intelligence devices within or outside the wifi network.

An embodiment of the invention comprises a general-purpose computer that has been programmed to perform particular functions as a specific purpose computer pursuant to the instruction from program software, such as the software described above.

According to an embodiment of the invention, when a package, letter or other delivery is anticipated, the source of the delivery, which can be an online retailer, transmits, such as by e-mail or text, a virtual key to the purchaser of the item. The virtual key can be a predetermined bar code(s), image(s), and/or other access authorizing input. When the purchaser receives the access authorizing input, that input is entered into the VSAT system. The delivery source can also provide the authorizing delivery input (virtual key) to a delivery person responsible for delivering the package, letter, or other delivery to the purchaser. Alternatively, the purchaser can provide the virtual key to the delivery person. The VSAT system stores the authorizing input until an anticipated match is received from a delivery person (bar code, image, numbers, etc.).

The VSAT system scanner scans the input from the delivery person to determine if it matches the authorizing input that had been entered by the purchaser. When a match occurs, the VSAT system is triggered to:

Provide access (such as by unlocking a door or container)
Deliver a preprogrammed message to the source of the delivery
Establish contact with appropriate individual(s)
Date stamp delivery
Notify appropriate individuals of delivery (such as the intended recipient)
Initiate two-way communication
Activate camera
Activate motion detection
Activate an artificial intelligence device which will then interface with the VSAT system providing instructions, directives, etc.

In an alternative embodiment of the invention, the intended recipient can create the authorizing input, such as a bar code(s) or image(s), and the intended recipient sends the authorizing input to the delivery source. For example, an individual can create a personalized authorizing input that the individual can provide to an online retailer at the time of making a purchase from the online retailer.

According to an embodiment of the invention, a system administrator has the ability to create barcodes, images, etc. or other authorizing inputs that can be sent for the purpose of access:

Deliveries
Guest

Family

Real Estate Sales

Service and repair personnel, etc.

Property management

An administrator/owner can create label and provide the label to a number of vendors. The label can be created by the sender using identified numbers or codes provided by the sender such as credit card number, number provided by administrator/owner at the time of order, and/or image selected by the administrator/owner at the time of order.

According to an embodiment of the invention, the VSAT system has the capability of sending a signal to a variety of access points. One of which can be mail compartments, storage compartments, entry, or other. Once access is provided, the access information becomes invalid, or can be programmed to expire at a designated time.

The VSAT system can include more than just a scanner as it includes the ability to deliver messages or information associated with each scan. The system also includes voice recognition and AI (artificial intelligence), either built in or networked with other external AI devices, enabling it to conduct inquiries, provide information, respond to inquiries, etc.

The VSAT system can be connected to a data base for the purpose of reading drivers licenses or other Identification cards or badges. The VSAT system date stamps, stores and configures a report of all activity. The VSAT system confirms deliveries, date stamping each, and provides access to package containers, storing them safely.

According to an embodiment of the invention, the two-way communication enables remote communication with the owner/administrator and the person triggering the scan.

Locking compartments or storage compartments for the VSAT system can be built in the structure or located in proximity to a structure in range of the VSAT wireless input.

Figure 2:
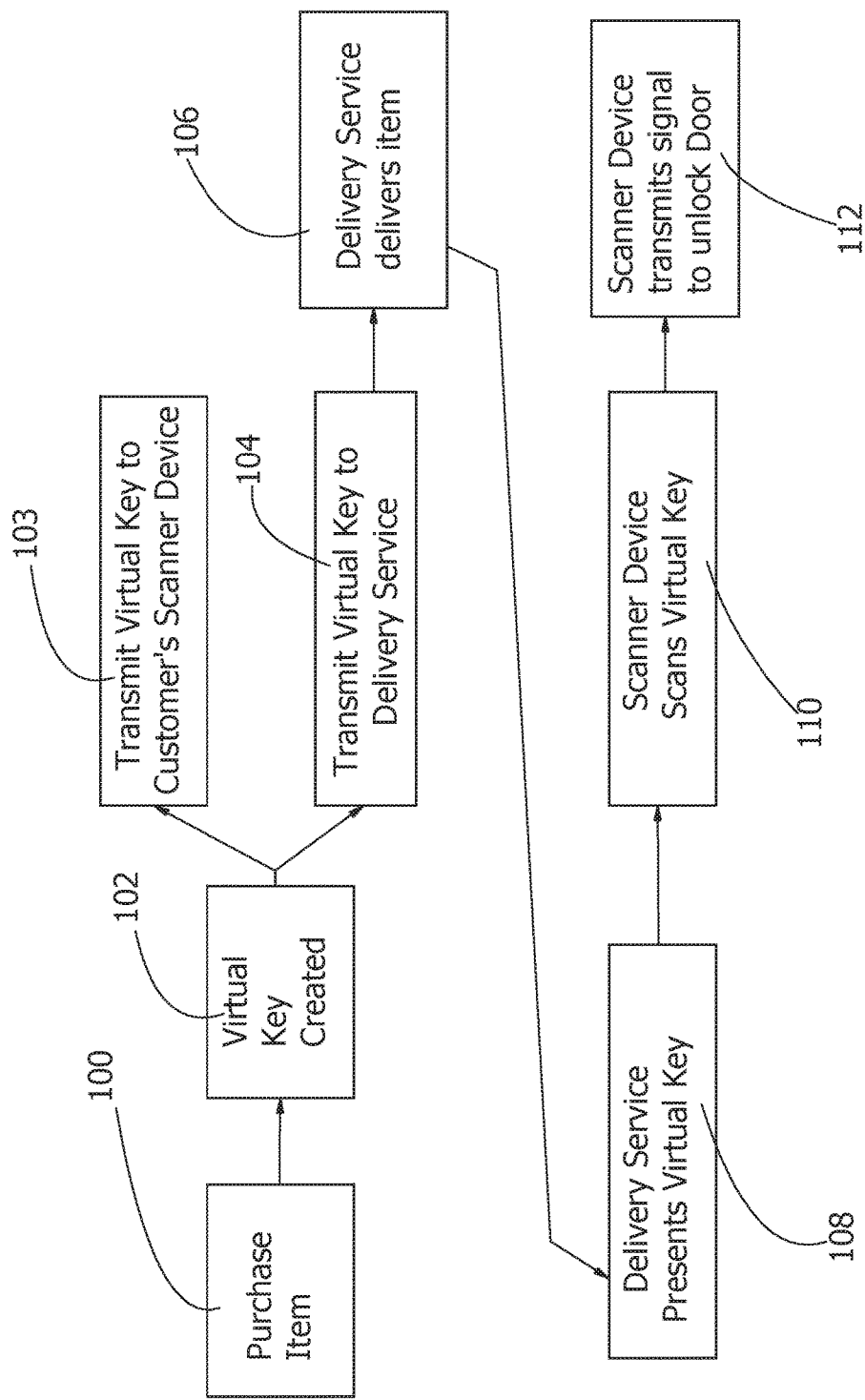
FIG. 2 illustrates a method of using the doorbell device of FIG. 1, according to a preferred embodiment of the invention.

FIG. 2 illustrates another embodiment of the invention. In the embodiment of the invention shown in FIG. 2, the VSAT system comprises a scanner device, such as the doorbell device 10 described above. Upon the purchase of an item from an online retail seller platform 100, a virtual key is created 102 and transmitted to the doorbell device 10 of the item purchaser 103. The virtual key is also sent to the delivery service that is to deliver the item to the purchaser 104. Upon delivering the item to the purchaser's location 106, the delivery service presents the virtual key 108, which can be a bar code that is scanned by the doorbell device. Upon scanning the virtual key 110, the doorbell device 10 transmits a signal to the door lock that unlocks the door 112. The VSAT system can program the virtual key so that it expires after a predetermined number of uses at the doorbell device 10. For example, the virtual key can expire after it has been scanned one time by the doorbell device 10. As such, the virtual key cannot be used again. Alternatively, the virtual key can be programmed to expire after a predetermined period of time.

According to an embodiment of the invention, the VSAT system can be used in the field of real estate sales. Real estate agents can send access information wirelessly in the form of a bar code or image to a potential buyer visiting a home for sale. The potential buyer can input the access information into the system to unlock the door of the home and gain entrance. The VSAT system can also confirm the identity of the potential buyer via driver's license scan. The system can monitor access via built in camera(s), conduct remote tour via interior cameras and monitor exit.

In another embodiment of the invention, the VSAT system can be used to receive service providers at a location, such as building contractors, sub-contractors, repair men, cleaning staff and other service personnel doing work at a residence. The homeowner can use the system to create access information and provide the information to the service providers who input the information into the system to gain access to the residence.

Another embodiment of the invention comprises a mobile app that allows for the creation of a virtual key to enable the transfer of keys for accessing a structure.

According to an embodiment of the invention, the VSAT system comprises a doorbell having a scanner and a mobile app that can be utilized by merchants. The mobile app allows the transfer of specific barcode or other information. Also, included in the app is the ability to create virtual keys which may be sent to delivery personnel or service people. An unlocking component is associated with the creation of the virtual keys.

According to an embodiment of the invention, the virtual key expires at a predetermined time selected by the creator of the virtual key. The virtual key can be securely sent to a cell phone for access by various personnel.

In another embodiment of the invention, multiple artificial intelligence (AI) devices communicate with one another in an established network. This allows messages to be shared, transmitted, and stored in other AI devices for both security and information purposes. If a delivery occurs and the recipient or occupant is not available, the VSAT system communicates with the AI device with a notification that may be stored or sent to another AI device. According to an embodiment of the invention, membership in the network can be accepted via programming of a code, IP address, or some other identifier that can be accepted by another device or devices for shared communication. The information may extend to the merchant who has the ability to send a message to an AI device regarding delivery, shipping, or order information. The AI device may also communicate instructions to the delivery person via the VSAT scanner or independently, in addition to storing important information from a delivery or service person.

Another embodiment of the invention comprises a system for delivering merchandise comprising an online membership platform on which a user, at the time of creating a membership, enters personal data, such as name, address, and credit card information. The user can create a virtual key, and enter special instructions for delivery personnel, such as the user's preferred location for leaving packages. The membership platform can be accessed at the time of making an online purchase. For example, an online retailer can make customers aware of the membership platform and provide a link to the platform when customers are about to make a purchase from the online retailer. Returning customers who have already created a membership can enter a password to bring up their existing membership. The system includes a scanner device that can read bar codes, images, and alphanumeric symbols. The scanner device can be encoded with the personal data of a particular user, including the user's "virtual key." The online retailer delivers the encoded scanner device to the particular user when the user creates a membership on the membership platform.

The user positions the scanner device proximate an access door of the user's home, business or other location to which the user has purchased from the online retailer is to be delivered. The scanner device can include adhesive or other attachment means that allows the scanner device to be attached to the user's home, storage container or other secure location. The scanner device can include a speaker, microphone, touch screen and camera. The online retailer assigns a unique confirmation code to the package to be delivered to the user and includes the code with the delivery information provided to the delivery service delivering the package. The confirmation code is printed on the package. When the package is delivered to the user's home, the delivery service personnel positions the package proximate the scanner device to allow the scanner device to scan the confirmation code. Once scanned, confirmation of receipt of the package is transmitted to the online retailer and the user. The user's virtual key is also included in the delivery information that is provided by the online retailer to the delivery service. Upon scanning of the package, the scanner device reads the virtual key. If the user entered special delivery instructions on the membership platform, the instructions (such as "place the package on the back porch") can be broadcast audibly via the speaker and/or presented visually as text on the touch screen. If the delivery service personnel has an issue and wishes to communicate with the user, he can do so using the microphone. The online retailer can offer an "upgraded" scanner device that includes means for installing an electronic lock on the user's access door that is operatively connected to the scanner device. Upon scanning of the package by the scanner device, the scanner device reads the virtual key, which triggers the electronic lock on the access door to unlock for a predetermined amount of time to allow the delivery service personnel to place the package inside the user's home.

A security system and a method of using same is described above. Various changes can be made to the invention without departing from its scope. The above description of preferred embodiments of the invention are provided for the purpose of illustration only and not limitation—the invention being defined by the claims and equivalents thereof.

What is claimed is:

1. A security system comprising a scanner device operatively connected to a computer processor and a non-transitory computer readable storage medium comprising software having programming instructions that, when executed, cause the computer processor to generate a virtual key comprising a graphic image and transmit the virtual key to a recipient, wherein the scanner device is adapted to read the virtual key from the recipient.

2. The security system according to claim 1, wherein the virtual key further comprises at least one from the group consisting of a bar code and an alphanumeric character.

3. The security system according to claim 1, further comprising a locking mechanism adapted to change between a locked position and an unlocked positioned, the locking mechanism operatively connected to a structure and the scanner device, wherein the scanner device transmits a signal to the locking mechanism causing the locking mechanism to reside in the unlocked position when the scanner device reads the virtual key from the recipient.

4. The security system according to claim 3, wherein the structure comprises at least one selected from the group consisting of a door of a building, a door of a residence, a door of a storage locker, a door of a lockbox, and a lid of a container.

5. The security system according to claim 3, wherein the recipient comprises a delivery service.

6. The security system according to claim 1, wherein the virtual key expires after a predetermined period of time.

7. The security system according to claim 1, further comprising at least one artificial intelligence device operatively connected to the scanner device and the computer processor.

8. The security system according to claim 1, further comprising a network of operatively connected artificial intelligence devices, wherein the network is operatively connected to the scanner device and the computer processor.

9. The security system according to claim 8, wherein membership in the network is accepted via a unique identifier.

10. A secured delivery system comprising:
(a) a doorbell device comprising a scanner;
(b) a lock operatively connected to the scanner and a structure, the lock adapted for changing between a locked position wherein an interior of the structure cannot be accessed and an unlocked position wherein the interior of the structure can be accessed; and
(c) a computer processor and a non-transitory computer readable storage medium comprising software having programming instructions that, when executed, cause the computer processor to generate a virtual key comprising a graphic image and transmit the virtual key to a delivery service, wherein the scanner is adapted to read the virtual key from the recipient and upon reading the virtual key transmits a signal to the lock causing the lock to move to the unlocked position whereby the interior of the structure can be accessed.

11. The delivery system according to claim 10, wherein the virtual key further comprises at least one from the group consisting of a bar code and an alphanumeric character.

12. The delivery system according to claim 10, wherein the structure comprises at least one selected from the group consisting of a door of a building, a door of a residence, a door of a storage locker, a door of a lockbox, and a lid of a container.

13. The delivery system according to claim 10, wherein the virtual key expires after a predetermined period of time.

14. The delivery system according to claim 10, wherein the virtual key expires after a predetermined number of uses.

15. The delivery system according to claim 10, wherein the doorbell device further comprises a housing, an audio speaker, a camera, a microphone, and a light.

16. The delivery system according to claim 10, further comprising at least one artificial intelligence device operatively connected to the scanner device and the computer processor.

17. The delivery system according to claim 10, further comprising a network of operatively connected artificial intelligence devices, wherein the network is operatively connected to the scanner device and the computer processor.

18. The delivery system according to claim 17, wherein membership in the network is accepted via a unique identifier.

19. A method of delivery comprising the steps of:
(a) providing a scanner device adapted to read a graphic image;
(b) positioning the scanner device proximate a structure;
(c) providing a lock operatively connected to the scanner device and a structure, the lock adapted for changing between a locked position wherein an interior of the structure cannot be accessed and an unlocked position wherein the interior of the structure can be accessed;
(d) purchasing an item;
(e) creating a virtual key comprising a graphic image;
(f) transmitting the virtual key to a delivery service responsible for delivering the item to a purchaser of the item;
(g) presenting the virtual key to the scanner device whereby the scanner device reads the virtual key; and (h) moving the lock to the unlocked position whereby the interior of the structure can be accessed in response to the scanner device reading the virtual key.

20. The method of delivery according to claim 19, further comprising the step of transmitting the virtual key to the purchaser of the item.

\* \* \* \* \*